United States Patent
Kim (10) Patent No.: US 9,965,236 B2
(45) Date of Patent: May 8, 2018

(54) VEHICLE HEAD UNIT AND METHOD OF OPERATING THE SAME

(71) Applicant: HYUNDAI MOTOR COMPANY, Seoul (KR)

(72) Inventor: Hyo Jeong Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 99 days.

(21) Appl. No.: 15/294,043

(22) Filed: Oct. 14, 2016

(65) Prior Publication Data

US 2017/0199714 A1 Jul. 13, 2017

(30) Foreign Application Priority Data

Jan. 12, 2016 (KR) .................. 10-2016-0003648

(51) Int. Cl.
*G09G 5/00* (2006.01)
*G06F 3/14* (2006.01)
(Continued)

(52) U.S. Cl.
CPC ........... *G06F 3/1407* (2013.01); *G09G 3/006* (2013.01); *G06F 11/00* (2013.01); *G09G 5/006* (2013.01);
(Continued)

(58) Field of Classification Search
CPC ....... G06F 3/1407; G06F 11/00; G09G 3/006; G09G 2320/029; G09G 2320/103; G09G 2330/12; G09G 2354/00; G09G 2370/22; G09G 2380/10; G09G 5/006; G09G 3/3233; G09G 3/3266; G09G 3/3283; G09G 2300/043; G09G 2300/0465;
(Continued)

(56) References Cited

U.S. PATENT DOCUMENTS 9,304,000 B2 * 4/2016 Yamaguchi ............ G01C 21/20
2011/0106910 A1 5/2011 Grasset
(Continued)

FOREIGN PATENT DOCUMENTS

JP 2006-311259 A 11/2006
JP 2011-77784 A 4/2011
(Continued)

OTHER PUBLICATIONS

Korean Office Action dated Jun. 1, 2017 form the corresponding Korean Application No. 10-2016-0003648, 5 pp.

*Primary Examiner* — Nelson Rosario
(74) *Attorney, Agent, or Firm* — Brinks Gilson & Lione (57) ABSTRACT

The present disclosure provides a method of operating a vehicle head unit including a processor executing an application related to a connectivity service. In particular, the method includes: determining, by the processor, whether a current frame of video stream data transmitted from a user terminal corresponds to a black screen based on a line included in the current frame; determining, by the processor, whether the black screen continues for a predetermined time upon determining that the current frame corresponds to the black screen; and notifying, by the processor, that the user terminal needs to be re-connected or re-executed upon determining that the black screen continues for the predetermined time.

18 Claims, 4 Drawing Sheets

(51) Int. Cl.
*G09G 3/00* (2006.01)
*G06F 11/00* (2006.01)

(52) U.S. Cl.
CPC . *G09G 2320/029* (2013.01); *G09G 2320/103* (2013.01); *G09G 2330/12* (2013.01); *G09G 2354/00* (2013.01); *G09G 2370/22* (2013.01); *G09G 2380/10* (2013.01)

(58) Field of Classification Search
CPC ... G09G 2300/0819; G09G 2300/0861; G09G 2320/0247; G09G 2320/0252; G09G 3/3659; G09G 3/001; G09G 3/32; G09G 3/3208; G09G 3/344; G09G 3/3446; G09G 2300/023; G09G 2300/0456; G09G 2340/0492; G09G 2340/14; G09G 2360/141; G09G 2360/144; G09G 2360/16; H04N 13/0033; H04N 13/044; H04N 2213/002; G02B 27/01
See application file for complete search history.

(56) References Cited

U.S. PATENT DOCUMENTS

| 2013/0316737 | A1 | 11/2013 | Guba et al. |
| 2015/0217728 | A1 | 8/2015 | Iwai |
| 2017/0195325 | A1* | 7/2017 | Yamamoto .......... H04L 63/0876 |

FOREIGN PATENT DOCUMENTS

| JP | 2013-182628 A | 9/2013 |
| KR | 10-0678050 B1 | 2/2007 |
| KR | 10-2013-0131209 A | 12/2013 |
| KR | 10-2014-0005613 A | 1/2014 |
| KR | 10-2014-0054742 A | 5/2014 |
| KR | 10-1446031 B | 9/2014 |
| KR | 10-2015-0100231 A | 9/2015 |

* cited by examiner

VEHICLE HEAD UNIT AND METHOD OF OPERATING THE SAME

CROSS-REFERENCE TO RELATED APPLICATION

This application claims priority to and the benefit of Korean Patent Application No. 10-2016-0003648, filed on Jan. 12, 2016, which is hereby incorporated by reference as in its entirety.

FIELD

The present disclosure relates to a vehicle head unit and a method of operating the same.

BACKGROUND

The statements in this section merely provide background information related to the present disclosure and may not constitute prior art.

Vehicle connectivity technology refers to a technique of easily and conveniently using communication and personalization information services in a vehicle based on connectivity between a vehicle head unit and a user terminal (e.g. smartphone). Combination of a user terminal regarded to be a very important to most people and a vehicle head unit is expected to be widely used.

For example, content stored in a user terminal can be output through a display of a vehicle head unit. Furthermore, the user terminal and the vehicle head unit are remotely connected through a mobile communication network such that the corresponding vehicle can be located in real time even when the vehicle is stolen or towed.

If the user terminal malfunctions while an application program being executed in the user terminal sends video data to the vehicle head unit and an image corresponding to the video data is displayed, normal video data may not be transmitted to the vehicle head unit. Here, content that needs to be displayed is not displayed on the display of the vehicle head unit, and a black screen, the greater part of which is displayed in black, appears on the display of the vehicle head unit, and thus the user may misrecognize that the black screen is caused by the vehicle head unit.

In this case, the user may be dissatisfied with the quality of the vehicle head unit and may have difficulty in immediately solving the problem since the user cannot be aware of which device has a problem. Furthermore, if the user takes various measures during driving in order to solve the problem, safe driving cannot be expected.

SUMMARY

The present disclosure provides a vehicle head unit capable of detecting an error in a user terminal and notifying a user of the error of the user terminal when the connectivity service is provided, and a method of operating the same.

The present disclosure provides a method of operating a vehicle head unit executing an application related to a connectivity service. The method may include: determining whether a current frame of video stream data transmitted from a user terminal corresponds to a black screen based on at least one line included in the current frame; determining whether the black screen continues for a predetermined time upon determining that the current frame corresponds to the black screen; and notifying that the user terminal needs to be re-connected or re-executed upon determining that the black screen continues for the predetermined time.

In another form of the present disclosure, a vehicle head unit executing an application related to a connectivity service includes: a decoding logic for storing, in an analysis buffer, data corresponding to a current frame of video stream data transmitted from a user terminal; and a black screen detecting logic for determining whether the current frame corresponds to a black screen based on at least one line included in the current frame with reference to the analysis buffer, for determining whether the black screen continues for a predetermined time upon determining that the current frame corresponds to the black screen and for notifying that the user terminal needs to be re-connected or re-executed upon determining that the black screen continues for the predetermined time.

The aforementioned vehicle head unit and method of operating the same according to the present disclosure can notify a user that display of a black screen is caused by an error of a user terminal when the black screen due to the error of the user terminal is displayed, thereby improving user experience and vehicle head unit quality index.

In addition, time and CPU operation load required to detect the black screen can be reduced by performing black screen detection for only some lines of the current frame.

The effects of the present disclosure are not limited to the above-described effects and other effects which are not described herein will become apparent to those skilled in the art from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Although the suffixes "module" and "unit" are used for constituent elements described in the following description, this is intended only for ease of description of the specification.

Figure 1:
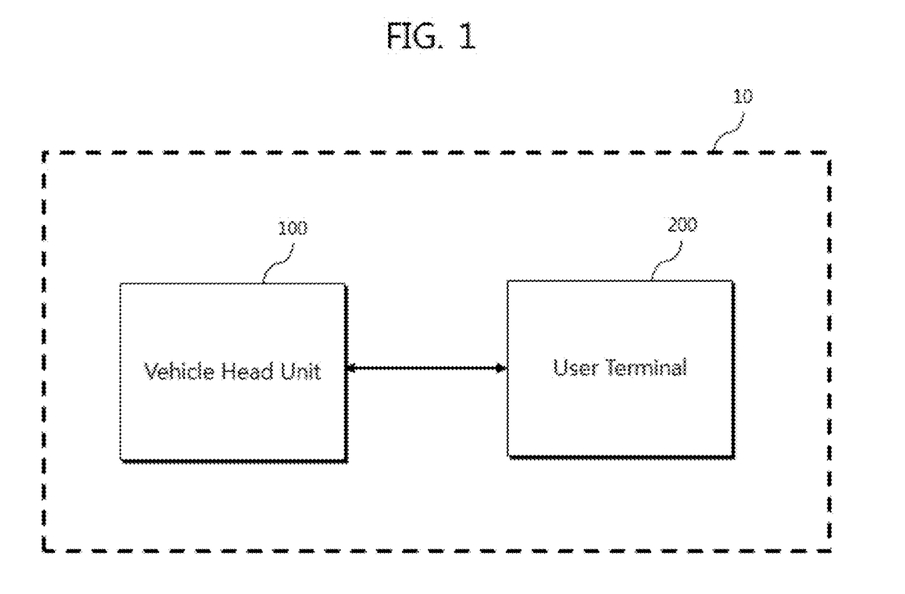
FIG. 1 is a block diagram of a connectivity system.
Figure 2:
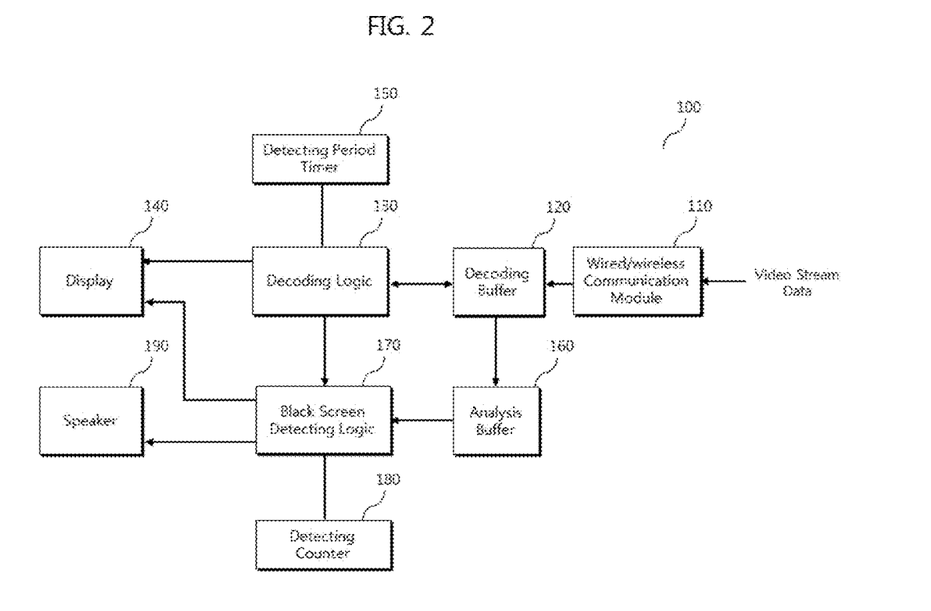
FIG. 2 is a block diagram of a vehicle head unit shown in FIG. 1.

FIG. 1 is a block diagram of a connectivity system according to one form of the present disclosure, and FIG. 2 is a block diagram of a vehicle head unit shown in FIG. 1.

Referring to FIGS. 1 and 2, a connectivity system 10 may include a vehicle head unit 100 and a user terminal 200 (e.g., a smartphone, a portable computer etc.) and provide a connectivity service by which the vehicle head unit 100 and the user terminal 200 can operate as input/output devices of the other sides using connectivity between the vehicle head unit 100 and the user terminal 200.

For example, the vehicle head unit 100 operates as an input/output device of the user terminal 200.

The vehicle head unit 100 may be embedded or installed in the dashboard of a vehicle and may provide multiple services such as air-conditioning, audio, video and navigation services of the vehicle, and the connectivity service with respect to an arbitrary terminal.

Connection between the vehicle head unit 100 and the user terminal 200 for the connectivity service may be implemented as wired connection such as MHL (Mobile High Definition Link) or wireless connection such as Bluetooth.

The user terminal 200 may be implemented as a cellular phone, a smartphone, a tablet PC, a notebook PC or the like. The user terminal 200 provides a variety of services as well as a call service by being equipped with a mobile platform and various types of applications executed in a mobile platform upper application layer. As the mobile platform, iOS of Apple, Android of Google, Symbian of Nokia, Blackberry of RIM, Windows Mobile of Microsoft, LiMo of LiMo Foundation, or the like may be used.

An application (e.g. CarPlay of Apple or Android Auto of Google) providing the connectivity service is installed and executed in the user terminal 200 such that the user terminal 200 can use the vehicle head unit 100 as an input/output device based on data communication with the vehicle head unit 100.

When the application is executed and data communication between the vehicle head unit 100 and the user terminal 200 is established, the vehicle head unit 100 may output video data and audio data, which are transmitted from the user terminal 200, through a display (140 of FIG. 2) and a speaker (190 of FIG. 2) thereof upon reception of the video data and the audio data.

FIG. 2 shows a configuration of the vehicle head unit 100. The vehicle head unit 100 may include: a wired/wireless communication module 110, a decoding buffer 120, a decoding logic 130, a display 140, a detecting period timer 150, an analysis buffer 160, a black screen detecting logic 170, a detecting counter 180 and a speaker 190.

The wired/wireless communication module 110 may support wired connection with the user terminal 200 using MHL or wireless connection with the user terminal 200 using Bluetooth and convert the protocol of video stream data received from the user terminal 200.

The decoding buffer 120 may store video stream data from the wired/wireless communication module 110. Here, the decoding buffer 120 may store the video stream data on a frame, line or pixel basis under the control of the decoding logic 130. To this end, the video stream data may include information about the start and end of one frame and a line size.

The decoding buffer 120 may be a part of a memory included in the vehicle head unit 100 and the analysis buffer 160, which will be described below, may be implemented as another part of the memory.

The decoding logic 130 may function as a decoder which decodes video stream data compressed by a specific codec into a format that can be output through the display 140. The decoding logic 130 may be used as a working space for decoding operation of the decoding buffer 120.

The decoding logic 130 may be implemented as a part of a central processing unit (CPU) included in the vehicle head unit 100 along with the black screen detecting logic 170. That is, the decoding logic 130 and the black screen detecting logic 170 can be executed or operated in independent threads in the CPU. A thread refers to an operation processing unit. While the number of threads may correspond to the number of cores, the scope of the present disclosure is not limited thereto.

The decoding logic 130 decodes the video stream data and sends the decoded video stream data to the display 140 such that the user can view the video stream data sent from the user terminal 200 through the display 140.

In addition, the decoding logic 130 may duplicate or transmit data corresponding to the current frame of video stream data stored in the decoding buffer 120 to the analysis buffer 160 according to a timer expiration signal of the detecting period timer 150. According to another form, the decoding logic 130 may duplicate or transmit data corresponding to at least one specific line included in the current frame, instead of the data of the current frame, to the analysis buffer 160 according to the timer expiration signal. In this case, memory capacity that needs to be allocated to the analysis buffer 160 can be reduced.

Upon transmission or duplication of the data, the decoding logic 130 may activate the black screen detecting logic 170.

The display 140 is a display device such as a liquid crystal display (LCD) capable of visually outputting video data and may output the decoded video stream data sent from decoding logic 130. In addition, the display 140 may output a pop-up window generated by the black screen detecting logic 170 which will be described later.

The detecting period timer 150 may generate the timer expiration signal and transmit the timer expiration signal to the decoding logic 130 whenever a detecting period set by the decoding logic 130 expires. In one form, the detecting period timer 150 may determine whether the detecting period expires by counting an internal clock signal of the vehicle head unit 100.

For example, when the detecting period is set to one second, the detecting period timer 150 can generate the timer expiration signal and transmit the same to the decoding logic 130 every second.

In addition, the detecting period may be adjusted in consideration of CPU load. For example, when a normal detecting period is one second, if a load with respect to an operation having higher thread priority than the black screen detecting logic 170 is generated, the decoding logic 130 can adjust the detecting period to 2 to 3 seconds. The thread priority refers to priority of occupying threads of the CPU of the vehicle head unit 100, and an operation having higher thread priority may be regarded as an operation of higher importance.

The analysis buffer 160 may store the data (or data corresponding to at least one specific line of the current frame) corresponding to the current frame sent from the decoding buffer 120.

The black screen detecting logic 170 is activated under the control of the decoding logic 130 and may determine whether the current frame corresponds to a black screen (screen which is displayed mostly in black instead of displaying content that needs to be displayed thereon) based on the data (or data corresponding to at least one specific line of the current frame) corresponding to the current frame.

Upon determining that the current frame corresponds to a black screen, the black screen detecting logic 170 may increase a counter value stored in the detecting counter 180 by a specific value (e.g. 1). Conversely, the black screen detecting logic 170 may initialize the counter value stored in the detecting counter 180 to an initial value (e.g. 0) upon determining that the current frame does not correspond to a black screen.

The black screen detecting logic 170 may determine whether the counter value reaches a threshold value (e.g. 20) with reference to the counter value stored in the detecting counter 180. When the counter value reaches the threshold value, the black screen detecting logic 170 may generate a pop-up window, send the pop-up window to the display 140 and transmit a warning sound to the speaker 190.

The pop-up window and the warning sound may include information indicating that the user terminal 200 needs to be re-connected or re-executed since normal images are not currently received from the user terminal 200.

The detecting counter 180 may store a counter value according to determination of the black screen detecting logic 170.

The speaker 190 may amplify an audio signal, remove noise therefrom and output the audio signal. Particularly, the speaker 190 may output the warning sound transmitted from the black screen detecting logic 170.

Figure 3:
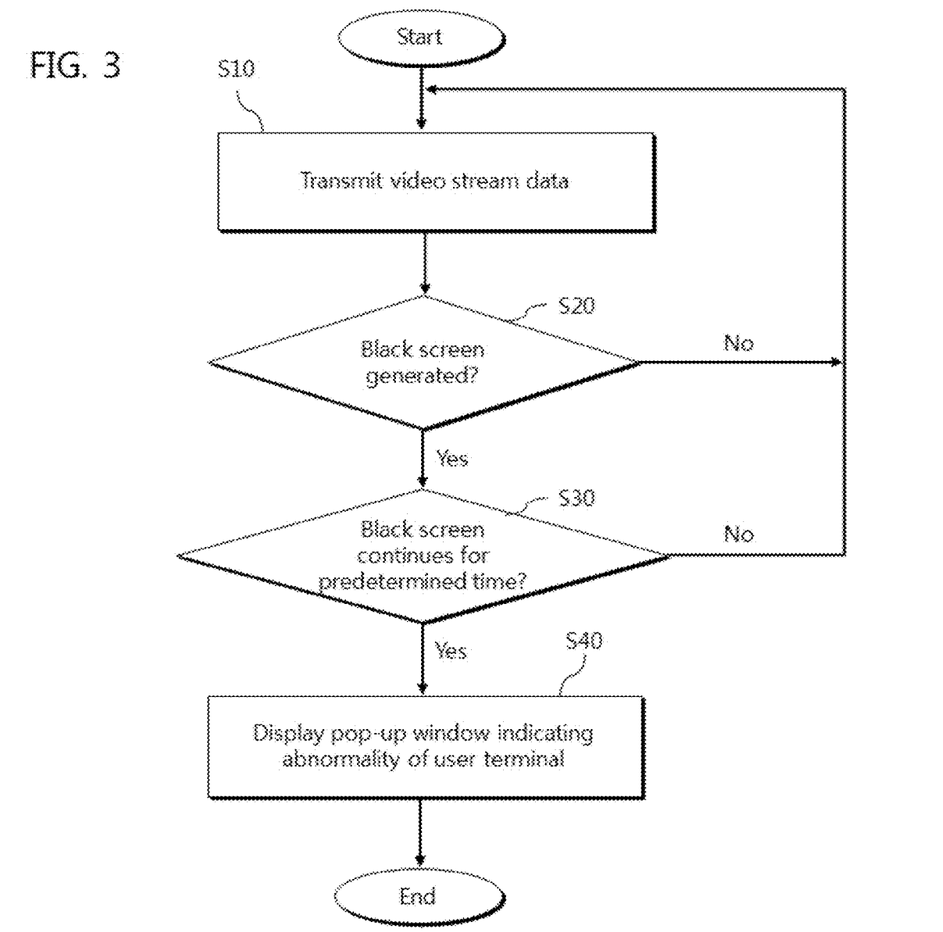
FIG. 3 is a flowchart illustrating a method of operating the vehicle head unit shown in FIG. 2.
Figure 4:
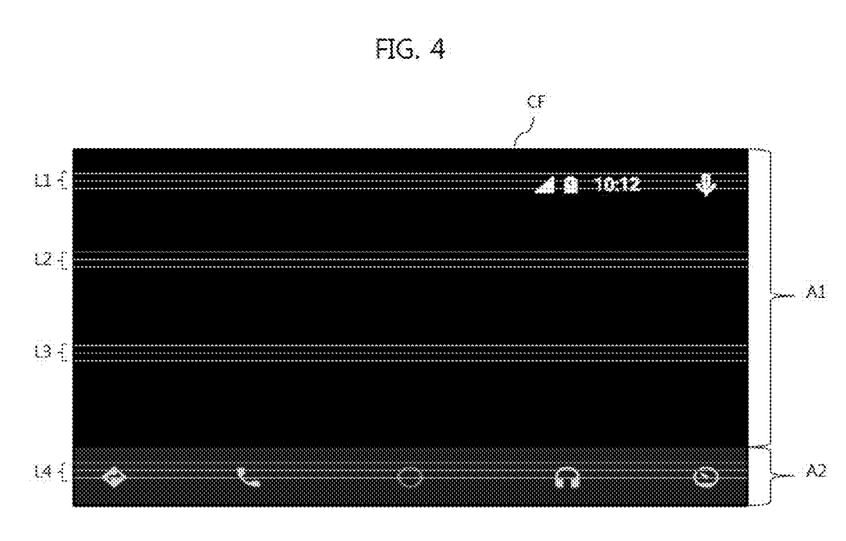
FIG. 4 is a diagram illustrating step S20 shown in FIG. 3.

FIG. 3 is a flowchart illustrating a method of operating the vehicle head unit 100 shown in FIG. 2, and FIG. 4 is a view illustrating step S20 shown in FIG. 3.

Referring to FIGS. 1 to 4, upon execution of the application providing the connectivity service and establishment of data communication between the vehicle head unit 100 and the user terminal 200, video stream data may be received by the wired/wireless communication module 110 and stored in the decoding buffer 120 (S10).

The decoding logic 130 may periodically transmit or duplicate data (or data corresponding to at least one specific line included in the current frame) corresponding to the current frame of the video stream data stored in the decoding buffer 120 to the analysis buffer 160 according to the timer expiration signal of the detecting period timer 150.

The black screen detecting logic 170 is activated under the control of the decoding logic 130 and may determine whether the current frame corresponds to a black screen based on the data (or data corresponding to at least one specific line included in the current frame) corresponding to the current frame (S20).

FIG. 4 shows the current frame CF. It is assumed that the current frame CF has a resolution of 800×480.

In addition, it is assumed that the data corresponding to the current frame CF has color data corresponding to 800× 480 pixels. The color of one pixel may be RGBA (Red, Green, Blue and Alpha). Accordingly, color data corresponding to one pixel can have a size of 4 bytes.

The black screen detecting logic 170 may determine whether the current frame corresponds to a black screen based on only data included in some lines of the current frame rather than the entire data corresponding to the current frame CF. The data included in some lines may be referred to as sample data since the data is a part of one frame.

FIG. 4 shows an example based on only 12 of 480 lines of the current frame having the resolution of 800×480.

That is, the 12 lines are divided into first to fourth line groups L1 to L4 each of which includes 3 lines.

For example, the first line group L1 may include lines having Y-coordinates (coordinates sequentially set from the top of the current frame CF in the Y-axis direction) of 45, 51 and 57, and the second line group L2 may include lines having Y-coordinates of 195, 201 and 207.

The third line group L3 may include lines having Y-coordinates of 372, 378 and 384, and the fourth line group L4 may include lines having Y-coordinates of 430, 436 and 448.

Here, spacing (e.g. 6) of the lines included in each line group may be determined in consideration of the resolution of the current frame CF.

The current frame CF can be divided into a plurality of areas in consideration of a menu screen of the application providing the connectivity service supported by the vehicle head unit 100.

That is, in the example of FIG. 4, the current frame CF is divided into a first area A1 and a second area A2.

The first area A1 displays content (e.g. video replay, images related to music and the like), whereas the second area A2 displays main menu icons irrespective of the content.

When a black screen is transmitted, all pixels are expressed in black in the first area A1, whereas all pixels are not expressed in black and the main menu icons are not displayed in the second area A2 having a background color with changed transparency (related to an alpha value).

Accordingly, it is desired to separate determination of whether the first area A1 displays a black screen from determination of whether the second area A2 displays a black screen.

Therefore, the black screen detecting logic 170 determines whether color data of all pixels included in each of the lines belonging to the first, second and third line groups L1, L2 and L3 of the first area A1 is black (0, 0, 0, 255).

However, the black screen detecting logic 170 determines whether color data of all pixels included in each of the lines belonging to the fourth line group L4 of the second area A2 is identical rather than determining whether the color data is black (0, 0, 0, 255). This is because it is more appropriate to determine whether the main menu icons are displayed in the second area A2 by checking whether all color data is identical since the second area A2 is very likely to display a background color having transparency (related to the alpha value) changed from black.

The above process is merely an example of dividing the current frame CF into a plurality of areas and determining whether the current frame CF corresponds to a black screen in consideration of a user interface of the application and the scope of the present disclosure is not limited thereto.

The first area A1 includes 9 lines for black screen detection and the second area A2 includes 3 lines for black screen detection. The numbers of lines included in the first area A1 and the second area A2 may be determined based on the ratios of Y-coordinate lengths of the first area A1 and the second area A2 to the Y-coordinate length of the current frame CF.

In addition, while the first to fourth line groups L1 to L4 may be equally spaced, the black screen detecting logic 170 may acquire information about an area in which icons or content is displayed from normal video stream data sent from the decoding logic 130 and determine the positions of the first to fourth line groups L1 to L4 based on the acquired information.

The black screen detecting logic 170 sequentially determines whether the first to fourth line groups correspond to a black screen for the current frame CF. If the black screen detecting logic 170 determines that any line does not correspond to a black screen during sequential determination, the black screen detecting logic 170 may not perform determination for the following lines.

When any of pixels belonging to the lines included in the first to third line groups L1 to L3 is not black or when any of pixels belonging to the lines included in the fourth line group L4 has a color different from other pixels, it is determined that the current frame does not correspond to a black screen.

In addition, black screen detection for the first to fourth line groups L1 to L4 may be independently performed and detection order may be changed. For example, after black screen detection for the fourth line group L4, black screen detection for the first to third line groups L1 to L3 can be performed.

Upon determining that the current frame CF does not correspond to a black screen (No of S20), the black screen detecting logic 170 may initialize the detecting counter 180 and then may be deactivated to enter a sleep mode so as to reduce operation load.

Upon determining that the current frame CF corresponds to a black screen (Yes of S20), that is, when all pixels belonging to the lines included in the first to third line groups L1 to L3 are black and when all pixels belonging to the lines included in the fourth line group L4 are the same color, the black screen detecting logic 170 may increase the counter value of the detecting counter 180 by a specific value (e.g. 1). In addition, the black screen detecting logic 170 may determine whether the black screen continues for a predetermined time T (e.g. 20 seconds) by checking whether the increased counter value equals a threshold value (e.g. 20) (S30)

The threshold value is set to a value greater than 1 in order to determine the current frame CF as a black screen only when the black screen continues for a predetermined time or longer since a delay time required for screen change may be generated due to load of the vehicle head unit 100 or load of the user terminal 200.

If the black screen does not continue for the predetermined time (No of S30), the black screen detecting logic 170 may be deactivated to enter a sleep mode so as to reduce operation load.

If the black screen continues for the predetermined time (Yes of S30), the black screen detecting logic 170 may generate a pop-up window, send the pop-up window to the display 140 and transmit a warning sound to the speaker 190 (S40).

The user can recognize that the user terminal 200 needs to be re-connected or re-executed since normal images cannot be currently received from the user terminal 200, through the pop-up window or the warning sound. That is, the user can be aware that the currently generated error is caused by the user terminal 200 that cannot transmit normal data rather than a problem in the vehicle head unit 100 and can be provided with a method for operating the user terminal 200 to solve the error.

Since a case in which it is determined that the current frame CF does not correspond to a black screen (No of S20), a case in which the black screen does not continue for the predetermined time (No of S30) and a case in which the user is notified of the error (S40) correspond to a state in which determination of the black screen detecting logic 170 is complete, the black screen detecting logic 170 may initialize the analysis buffer 160 such that data corresponding to the next frame can be stored therein.

The algorithm illustrated in FIG. 4 may be executed only when video stream data is received from the user terminal 200.

The vehicle head unit and method of operating the same according to the present disclosure can notify the user that display of a black screen is caused by a problem in the user terminal when the black screen due to the problem in the user terminal is displayed, thereby improving user experience and vehicle head unit quality index.

In addition, time and CPU operation load required to detect the black screen can be reduced by performing black screen detection for only some lines of the current frame.

The aforementioned method of operating the vehicle head unit 100 may be implemented as computer-readable code stored in a computer-readable recording medium. The computer-readable recording medium includes all kinds of recording media storing data readable by a computer system. Examples of the computer-readable recording medium include a ROM, a RAM, a magnetic tape, a magnetic disk, a flash memory, an optical data storage device and the like. In addition, the computer-readable recording medium may be distributed to computer systems connected through a computer communication network, stored and executed as code readable in a distributed manner.

Although exemplary aspects of the present disclosure have been described for illustrative purposes, those skilled in the art will appreciate that various modifications, additions and substitutions are possible, without departing from essential characteristics of the present disclosure. Thus, forms disclosed herein are only exemplary and not to be considered as limitative of the present disclosure.

What is claimed is:

1. A method of operating a vehicle head unit including a processor executing an application related to a connectivity service, the method comprising:
   determining, by the processor, whether a current frame of video stream data transmitted from a user terminal corresponds to a black screen based on at least one line included in the current frame;
   determining, by the processor, whether the black screen continues for a predetermined time upon determining that the current frame corresponds to the black screen; and
   notifying, by the processor, that the user terminal needs to be re-connected or re-executed upon determining that the black screen continues for the predetermined time.

2. The method according to claim 1, wherein the determining whether the current frame corresponds to the black screen comprises determining whether all pixels belonging to lines included in a first area in which content is displayed are black.

3. The method according to claim 1, wherein the determining whether the current frame corresponds to the black screen comprises determining whether all pixels belonging to lines included in a second area in which menu icons are displayed are a same color.

4. The method according to claim 1, wherein the determining whether the current frame corresponds to the black screen is periodically performed according to a timer expiration signal of a detecting period timer.

5. The method according to claim 1, wherein the determining whether the black screen continues for the predetermined time comprises:
   increasing a counter value of a detecting counter by a specific value; and
   determining whether the increased counter value equals a threshold value.

6. The method according to claim 1, wherein the notifying that the user terminal needs to be re-connected or re-executed comprises:
   outputting a pop-up window through a display; and
   outputting a warning sound through a speaker.

7. A vehicle head unit configured to execute an application related to a connectivity service, the vehicle head unit comprising:
a processor configured to store, in an analysis buffer, data corresponding to a current frame of video stream data transmitted from a user terminal, configured to determine whether the current frame corresponds to a black screen based on at least one line included in the current frame with reference to the analysis buffer, configured to determine whether the black screen continues for a predetermined time upon determining that the current frame corresponds to the black screen, and configured to notify that the user terminal needs to be re-connected or re-executed upon determining that the black screen continues for the predetermined time.

8. The vehicle head unit according to claim 7, wherein the processor is configured to determine whether all pixels belonging to lines included in a first area in which content is displayed are black.

9. The vehicle head unit according to claim 7, wherein the processor is configured to determine whether all pixels belonging to lines included in a second area in which menu icons are displayed are a same color.

10. The vehicle head unit according to claim 7, wherein the processor is configured to periodically store the data corresponding to the current frame in the analysis buffer according to a timer expiration signal of a detecting period timer.

11. The vehicle head unit according to claim 7, wherein the processor is configured to increase a counter value of a detecting counter by a specific value and determine whether the increased counter value equals a threshold value.

12. The vehicle head unit according to claim 7, wherein the processor is configured to control a pop-up window to be output through a display and control a warning sound to be output through a speaker.

13. The vehicle head unit according to claim 7, wherein the storing and the determining are performed in different threads in a central processing unit (CPU) of the vehicle head unit.

14. A vehicle head unit configured to execute an application related to a connectivity service, the vehicle head unit comprising:
a processor configured to periodically store, in an analysis buffer, data corresponding to a current frame of video stream data transmitted from a user terminal according to a timer expiration signal of a detecting period timer, determine whether the current frame corresponds to a black screen and whether the black screen continues for a predetermined time based on sample data included in the current frame with reference to the analysis buffer, and notify that the user terminal needs to be re-connected or re-executed upon determining that the black screen continues for the predetermined time.

15. The vehicle head unit according to claim 14, wherein a black screen detecting logic executed by the processor is deactivated to enter a sleep mode upon determining that the current frame does not correspond to the black screen.

16. The vehicle head unit according to claim 14, wherein a black screen detecting logic executed by the processor increases a counter value of a detecting counter by a specific value and is deactivated to enter a sleep mode upon determining that the black screen does not continue for the predetermined time.

17. The vehicle head unit according to claim 14, wherein the processor is configured to determine whether all pixels belonging to lines included in a first area in which content is displayed are black.

18. The vehicle head unit according to claim 14, wherein the processor is configured to determine whether all pixels belonging to lines included in a second area in which menu icons are displayed are a same color.

* * * * *